US007912065B2

(12) United States Patent
See et al.

(10) Patent No.: US 7,912,065 B2
(45) Date of Patent: *Mar. 22, 2011

(54) AUTOMATED VOICE OVER IP DEVICE VLAN-ASSOCIATION SETUP

(75) Inventors: Michael See, Chapel Hill, NC (US); Marc Boullet, Colombes (FR)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1624 days.

This patent is subject to a terminal disclaimer.

(21) Appl. No.: 10/728,454

(22) Filed: Dec. 5, 2003

(65) Prior Publication Data

US 2004/0125923 A1 Jul. 1, 2004

Related U.S. Application Data

(60) Provisional application No. 60/437,215, filed on Dec. 31, 2002.

(51) Int. Cl.
*H04L 12/28* (2006.01)
(52) U.S. Cl. ............... 370/395.3; 370/395.2; 370/400
(58) Field of Classification Search ............ 370/356, 370/328, 389, 467, 395.2, 395.3, 338, 400; 707/9; 709/242, 227, 225
See application file for complete search history.

(56) References Cited

U.S. PATENT DOCUMENTS

| | | | | |
|---|---|---|---|---|
| 6,081,522 | A * | 6/2000 | Hendel et al. ................. | 370/389 |
| 6,687,245 | B2 * | 2/2004 | Fangman et al. ............ | 370/356 |
| 6,781,989 | B1 * | 8/2004 | Acharya ....................... | 370/392 |
| 6,804,254 | B1 * | 10/2004 | Pearce et al. ................. | 370/467 |
| 6,847,620 | B1 * | 1/2005 | Meier ............................ | 370/328 |
| 7,099,332 | B2 * | 8/2006 | Leung ........................ | 370/395.42 |

(Continued)

FOREIGN PATENT DOCUMENTS

WO    WO 02/18965 A1    3/2002

OTHER PUBLICATIONS

Cisco Systems et al., "Chapter 2: Campus Infrastructure Considerations," Campus Infrastructure Considerations, Aug. 8, 2001, p. 11-19, Retrieved from the Internet :<URL: http://www.cisco.com/univercd/cc/td/doc/product/voice/ip_tele/network/dgcampus.h>, Retrieved on May 21, 2002.

(Continued)

*Primary Examiner* — Fan Tsang
*Assistant Examiner* — Simon King
(74) *Attorney, Agent, or Firm* — Galasso & Associates, LP

(57) ABSTRACT

A system and method are disclosed for automatically registering various system attributes with a VoIP device such as an VoIP phone. The system attributes are provided by a network, preferably an adjacent switching device made aware of the system attributes through one of a number of learning mechanisms. The system attributes may include one or more of the following: the VLAN identification used for VoIP communications in the subnet in which the VoIP phone is connected; the switching device identification, switching device slot, and switching device port number to which the VoIP phone is connected. The switch, slot, and port are used in some embodiments by an IP PBX system to construct a relational database that associates the geographic location of the connection with the IP phone for purposes of reporting the physical location of the VoIP user to emergency response personnel. The system and method for automatically registering various system attributes enables the relational database to be updated prompt and accurate.

20 Claims, 4 Drawing Sheets

U.S. PATENT DOCUMENTS

| | | | |
|---|---|---|---|
| 7,577,142 B2* | 8/2009 | Kloth | 370/392 |
| 7,577,148 B2* | 8/2009 | Lor et al. | 370/392 |
| 2002/0027906 A1* | 3/2002 | Athreya et al. | 370/386 |
| 2002/0124107 A1* | 9/2002 | Goodwin | 709/242 |
| 2003/0152075 A1* | 8/2003 | Hawthorne et al. | 370/389 |
| 2003/0216143 A1* | 11/2003 | Roese et al. | 455/456.1 |
| 2003/0217122 A1* | 11/2003 | Roese et al. | 709/219 |
| 2004/0003094 A1* | 1/2004 | See | 709/227 |
| 2004/0047320 A1* | 3/2004 | Eglin | 370/338 |
| 2004/0068668 A1* | 4/2004 | Lor et al. | 713/201 |
| 2004/0078469 A1* | 4/2004 | Ishwar et al. | 709/227 |
| 2005/0030955 A1* | 2/2005 | Galin et al. | 370/401 |
| 2005/0044271 A1* | 2/2005 | Bastide et al. | 709/245 |
| 2007/0280212 A1* | 12/2007 | Chen et al. | 370/356 |

OTHER PUBLICATIONS

Goodwin, Michele, "VLAN Advertisement Protocol," U.S. Appl. No. 10/028,647, filed Dec. 19, 2001, published as US 2002/0124107 A1 on Sep. 5, 2002, Relevant parts: Figure 1, Figure 5, and Paragraph '0013!—Paragraph '0136!.

* cited by examiner

AUTOMATED VOICE OVER IP DEVICE VLAN-ASSOCIATION SETUP

CROSS-REFERENCE TO RELATED APPLICATION

This application claims the benefit of U.S. provisional application Ser. No. 60/437,215, entitled "COMMUNICATION NETWORK HAVING IP PHONE LOCATION ASSOCIATION," filed Dec. 31, 2002, the contents of which is hereby incorporated herein by reference for all purposes.

FIELD OF INVENTION

The invention relates to Voice-over-Internet Protocol (IP) technology used to manage Voice-over-IP devices in a distributed network. In particular, the invention relates to a system and method for automatically transmitting system attributes including the Virtual Local Area Network (VLAN) identifier and physical connectivity information from a network node to a Voice-over-IP device.

BACKGROUND

When building data networks to support voice-over-IP (VoIP) communications it is often desirable to place the IP Phones in a separate VLAN from the other data devices in the network. This makes it easier for the switches in the network to provide the Quality of Service processing needed to ensure proper transmission of VoIP calls. The switches in the network are configured with the VLAN dedicated for VoIP traffic. The VLAN to which an IP phone belongs is identified using an IEEE 802.1Q tag with the VLAN value in the Ethernet frames, for example, generated by the device. After being assigned, the VLAN value is placed in the header of substantially all frames transmitted by the IP phone.

Unfortunately, the current protocols defined for distributing VLAN information between switches do not provide a mechanism to inform end users which VLAN should be used for purposes of sending traffic. The VLAN identification must therefore be manually configured in each VoIP phone either directly or through a network management tool. Such practices are both time consuming and raise the potential for human error. To add to the burden, it may be necessary to reconfigure an IP phone with a new VLAN if the IP phone is moved to a different switch or if the VoIP VLAN configuration of the switch is changed.

There are mechanisms for distributing information between switches about the VLANs configured on the respective switches and for distributing the information between switches to construct a topologic map of the network, for example. The Group Address Resolution Protocol (GARP) VLAN Address Resolution Protocol (GVRP) standardized by the IEEE in IEEE Standard 802.1Q-1998-IEEE Standards for Local and Metropolitan Area Networks: Virtual Bridged Local Area Networks provides a mechanism for conveying information between switches in the network about the IEEE 802.1Q VLANs configured on the switches and on which ports of the respective switches these VLANs are configured. In particular, the IEEE 802.1Q standard defines an architecture for Virtual Bridged LANs, the services provided in Virtual Bridged LANs, and the protocols and algorithms involved in the provision of those services. However, no such mechanism has been defined for communicating VLAN configuration information from a network device to an end system.

In addition to communicating VLAN configuration information to a VoIP phone, it is also desirable to communicate physical location information from the phone to an IP private branch exchange (PBX). Enhanced 911 solutions, for example, require that phone systems such as IP PBXs provide physical location information with a 911 call using a mechanism called the automatic location indicator (ALI). The ALI allows an emergency service provider to automatically determine the physical location of the person placing the 911 call. The current state of the art for associating physical location information with the phone number that identifies a telephone uses an external database. The PBX then consults this external database when processing a 911 call to extract the physical location information associated with the telephone placing the 911 call. The location information in the external database must be manually entered and is inaccurate when a phone is moved to new locations in the network until the database is manually updated.

There is therefore a need for a system and method to automatically communicate VLAN information to IP phones and to automatically convey physical connectivity information to a central store with minimal human intervention, minimal delay, and maximal accuracy.

SUMMARY

The invention according to the preferred embodiment features a method that comprises steps for exchanging system attributes between at least one VoIP device and another node in the network. In some embodiments, the VoIP device is an IP phone and the node to which it is operatively coupled is an adjacent switching device or other addressable entities embodied in a processor, computer, or other appliance. The VoIP phone is preferably one of a plurality of devices that cooperate with an IP PBX employed in an enterprise network, for example.

The system attributes transmitted between the IP phone and other nodes may include, but are not limited to, one of the following: the VLAN identification of a VoIP VLAN assigned in the network, the switching device identification, slot number and port number to which the IP phone is connected. The identification, slot number, and port number may also be communicated to the IP PBX where they are used to relate the physical location of the port connection with the IP phone to which it is connected. The transmission of system attributes occurs automatically upon one of several triggering events, thereby avoiding the need for manual configuration of the system attributes.

In the preferred embodiment, the system attribute exchange comprises two messages, namely a first message referred to herein as a VoIP device identification message generated by the VoIP device, and a second message referred to herein as a VoIP device identification acknowledgment provided by the appropriate node in response. The VoIP device identification message notifies the node that the device is in fact a VoIP device for which a VLAN assignment is warranted. In response, the node automatically transmits the VoIP device identification acknowledgment including the one or more system attributes. In some embodiments, the VoIP device identification message is generated automatically when (a) the IP phone is operatively coupled to the network, generally at the time it is initialized, or (b) the switching device is initialized. In the later case, the VoIP device identification message may be automatically transmitted in response to a node initialization message, i.e. a switching device notification message that elicits identifying information from adjacent devices.

The invention in some embodiments features a system for performing the connectivity-information exchange. The system generally includes at least one VoIP device such as an IP phone and a network device such as a switching device. The VoIP device and node are adapted to automatically send the VoIP device identification message and VoIP device identification acknowledgment in the manner described herein. With the system for performing the connectivity-information exchange, the VoIP VLAN to which the VoIP device is intended may be configured automatically with minimal or no manual intervention, thereby reducing the labor necessary to configure the VoIP network. The absence of human intervention may also increase the accuracy of a relational database used to report the physical location of an IP phone user to emergency response personnel, as described herein.

BRIEF DESCRIPTION OF THE DRAWINGS

The present invention is illustrated by way of example and not limitation in the figures of the accompanying drawings, and in which.

DETAILED DESCRIPTION OF THE INVENTION

Figure 1:
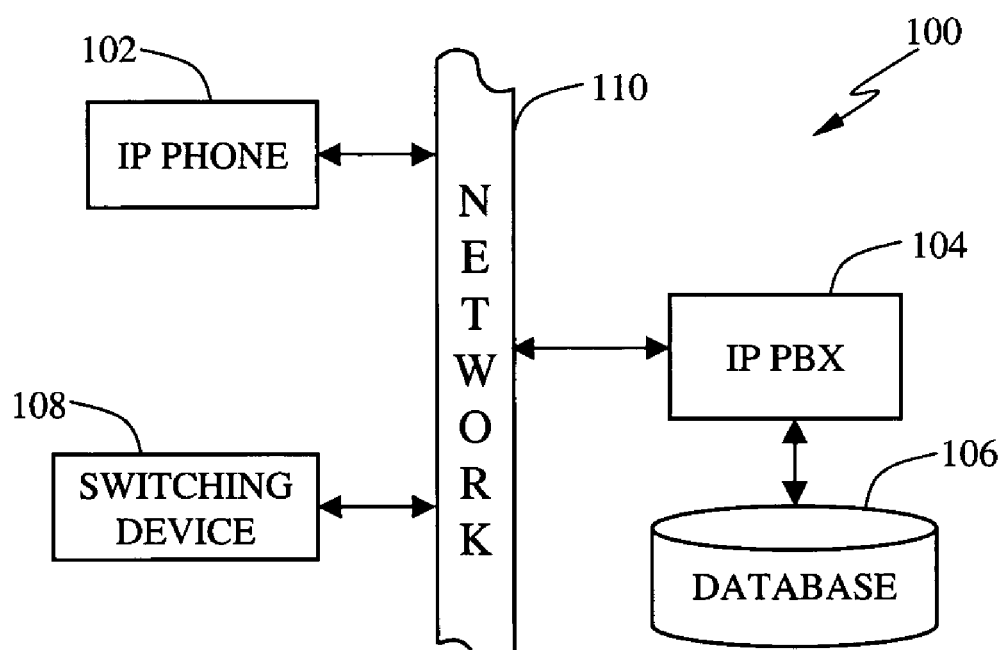
FIG. 1 is a distributed network topology with which the preferred embodiment of the present invention may be implemented.

Referring to FIG. 1, a distributed network topology with which the present invention may be implemented is illustrated. The network topology 100 comprises one or more subnets 110, which may include an intranet, a local area network (LAN), a wide area network (WAN), or a metropolitan area network (MAN), and/or the Internet, for example. The subnet 110 associated with the IP phone 102 is preferably an Ethernet network. Operably connected to the subnet 110 are a plurality of network devices including one or more VoIP communication devices 102, an IP PBX 104, and a switching device such as a bridge or router adapted to perform layer 2 and/or layer 3 switching operations as defined in the OSI network model.

The VoIP device in the preferred embodiment is an IP phone that operates in cooperation with the IP PBX 104 and/or other VoIP devices (not shown) using the Session Initiation Protocol (SIP), Real Time Protocol (RTP), or suitable alternative voice communication protocol. The IP phone 102 communicates indirectly with the IP PBX 104 by means of the switching device 108. As prescribed herein, the switching device 108 facilitates the formation and maintenance of an audio communication session between the VoIP communication device 102 and the IP PBX or between two VoIP communications devices 102. In some embodiments, the communication session also supports audio and video communication sessions.

In the preferred embodiment, the IP phone 102 is enabled with a VLAN tagging protocol, preferably 802.1Q or suitable equivalent, for purposes of incorporating a VLAN identifier (VID) in outgoing transmissions. The 802.1Q tag may be inserted by a software stack in the IP phone or by a network interface card, for example.

In prior art systems, the VID used by the IP phone 102 would necessarily be manually configured by the network administrator, which is both labor intensive and subject to human error. To overcome these limitations, the several embodiments disclosed herein provide a mechanism to automatically initiate an exchange referred to herein as the system attribute exchange. The system attribute exchange includes one or more messages or transmissions between the VoIP device 102 and the adjacent switching device 108 for purposes of distributing one or more system attributes to the VoIP device, including the appropriate VID, to be used by the device for VoIP communications. In some embodiments the system attributes comprises the VID used for VoIP communications, although the system attribute exchange may further convey information pertaining to the switching device identification, slot number, and port number associated with the IP phone 102.

The connectivity-information exchange may be initiated when the IP phone 102 is connected to the subnet 110 and initialized, when the switching device 108 is initialized, or when the switching device first detects the presence of a device, such as IP phone 102 connected to one of the switch ports.

Figure 2:
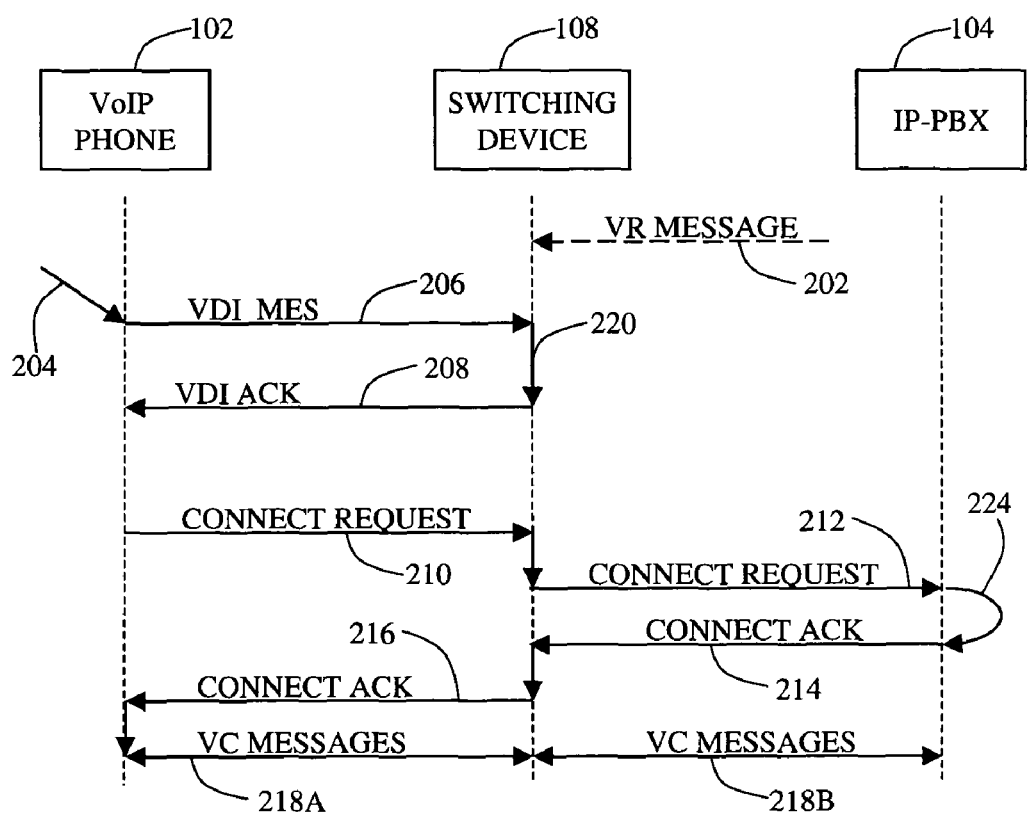
FIG. 2 is a flow diagram illustrating a system attribute exchange between an IP phone and switching device upon initialization of the IP phone, according to the preferred embodiment of the present invention.

Illustrated in FIG. 2 is a flow diagram of a system attribute exchange with an IP phone upon initialization of the IP phone. The IP phone 102 is initialized in step 204 when the phone is plugged into the network 110. This may occur when the phone is first coupled to the subnet 110 or when the IP phone is relocated in the subnet 110. In both cases, the IP phone 102 transmits a VoIP device identification (VDI) message 206. In this embodiment, the VDI message 206 is the first of a plurality of transmissions that constitute the system attribute exchange.

The primary purpose of the VDI message 206 is to announce the presence of the IP phone 102, i.e. to identify the IP phone 102 as a VoIP device to the adjacent switching device 108. The identity of the device as a VoIP device is important for purposes of including the IP phone 102 in the VLAN reserved for VoIP, and incorporating the IP phone 102 into the switching device's forwarding tables as soon as is reasonably possible. After the adjacent switching device 108 is provided notice of the installation of the IP phone 102, the IP PBX is also made aware of the presence of the IP phone 102 by means of a separate message exchange between the IP phone and the PBX, for example.

In the preferred embodiment, the VDI message 206 is generated by the IP phone 102 using what is referred to herein as an Attribute Advertisement Protocol (AAP). AAP may be used to communicate information including the VID or other attributes between AAP-enabled network devices such as the IP Phone 102 and adjacent switching device 108. Although AAP may incorporate one or more standard protocols, it is generally a localized solution supported by network devices of specific vendor using a non-standardized signaling convention enabled on various devices of the vendor. An advertisement protocol that may be adapted for purposes of this invention is taught in copending U.S. patent application Ser. No. 10/028,647, entitled "VLAN Advertisement Protocol," hereby incorporated by reference herein.

Figure 4:
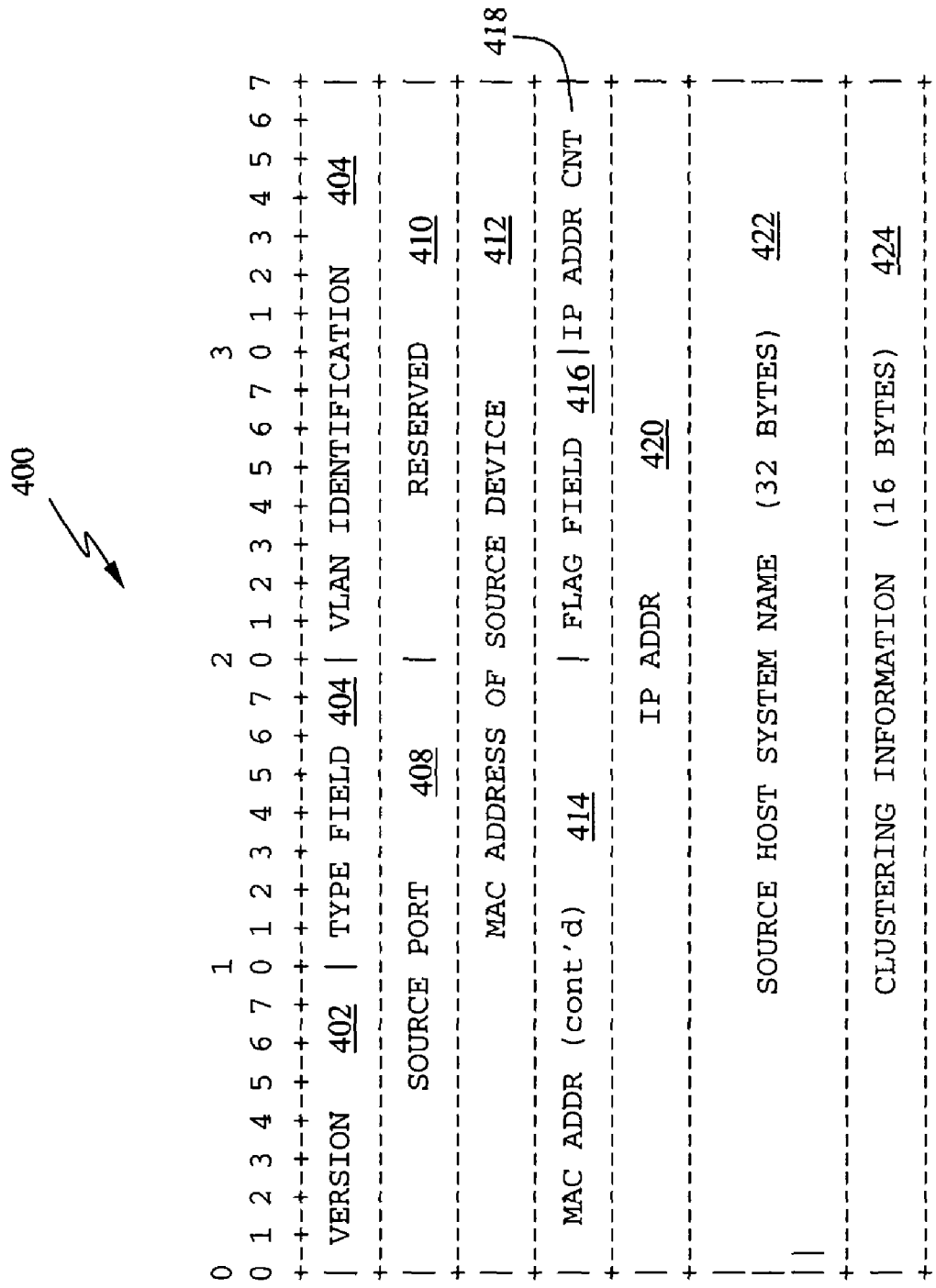
FIG. 4 is a packet definition with which the VoIP device identification message and VoIP identification acknowledgement may be generated, according to the preferred embodiment of the present invention.

The VDI message 206 of the preferred embodiment, illustrated in FIG. 4, comprises an AAP version number, AAP type, VLAN identification, source port, media access control (MAC) address, flag field, IP address count and IP address, source host name, and clustering information. The purposes of the fields of the VDI message 206 are as follows:

a) Version number 402, preferably one byte, is assigned a value to distinguish it from other AAP packet versions;

b) AAP type field 404, preferably one byte, is used to distinguish the AAP message as being a VDI message from other AAP message types;

c) VID 406, preferably 2 bytes, is generally used to designate the VLAN of the device identified by the MAC address field, which assigned a value of zero since it is unknown to the IP phone 102 at the time of transmission;

d) Source Port 408, preferably two bytes, is generally used to specify the port on the switch to which the phone is attached. Typically this is the slot number and port number where the IP phone is attached, but is assigned a value of zero since it is inapplicable to the IP phone 102;

e) Reserved 410, two bytes herein, is unused in the present embodiment;

f) MAC Address 412, 414, preferably six bytes, is used to specify the MAC address of the source device, IP phone 102;

g) Flags 416, preferably one byte, assigned the value zero for an initial VDI packet;

h) IP Address Count 418, preferably one byte, identifies the number of IP addresses contained in the frame, typically this is assigned a value of one;

i) IP Addresses 420, preferably multiple of four bytes, is used to specify the IP address(es) of the device identified by the MAC address. In the case of the IP phone this will typically be all zeros for the initial message;

j) Source Host System Name 422, preferably 32 bytes, is used to specify the name of source device, IP phone 102; and k) Reserved 424, 16 bytes, is used in other AAP messages but not in VDI messages.

In the preferred embodiment, the VDI message 206 is incorporated into a packet having a special unicast MAC address since the MAC address of the switching device 108 is unknown to the IP phone 102 at the time of transmission. The MAC address used in some embodiments, 00-20-DA-00-70-04, is reserved for AAP communications between devices pre-configured to recognizes this address. Alternatively, a broadcast address of FF-FF-FF-FF-FF-FF can be used as the destination MAC address. Upon receipt, the frame including the AAP header 400 is forwarded to an AAP processing agent in the switching device 108 responsible for recognizing incoming AAP frames and generating the appropriate response.

When received, the switching device 108 forwards the VDI message 206 to software where the source device is determined to be a VoIP phone. In addition, the switching device also determines that the VDI message 206 is an introduction, in a manner of speaking, to which it must respond with further information. The response, generated in step 220, is a "VDI acknowledgement" 208 that informs the IP phone 102 of the VLAN configuration in the switching device 108 for VoIP traffic and the 802.1Q value assigned to this VLAN, namely the VID 402. The VLAN specified by the switching device 108 to the IP phone 102 is preferably the only VLAN dedicated to VoIP within that particular segment of the subnet, although one skilled in the art will recognize that multiple VLANs may be set aside within an enterprise for voice data.

In the preferred embodiment, the VDI acknowledgement 208 further includes "connectivity information" which, when associated with the geographic distribution of the nodes of the network 106, can be used to geographically pinpoint the location of the IP phone 102. In the preferred embodiment, the connectivity information includes, but is not limited to, the switching device identification as well as the port identification including, for example, slot number and port number on which the IP phone 102 connects to the switching device 108. The VLAN information and the connectivity information described above are preferably communicated to the IP Phone 102 in the same packet, although a plurality of packets may also be employed. In addition, the VLAN used for VoIP is known to the switching device 108 as a result of one or more configuration messages entered via the switch console or received from a network management entity.

The VDI acknowledgement 208 of the preferable embodiment comprises an AAP version number, AAP type, VLAN identification, source port, MAC address, flag field, total IP address and IP address, source host name, and clustering information. The purposes of the fields of the VDI acknowledgement 208 fields are as follows:

a) Version number, preferably one byte, is assigned a value to distinguish it from other AAP packet versions;

b) AAP type, preferably one byte, is used to distinguish the AAP message as being a VDI message from other AAP message types;

c) VID, preferably 2 bytes, is used to designated the VLAN (or default VLAN of port) to be used by the VoIP device in its transmissions;

d) Source Port, preferably two bytes, is used to specify the port information, preferably source slot and port value to which the phone is attached;

e) Reserved, two bytes herein, is unused in the present embodiment;

f) MAC Address, preferably six bytes, is used to specify the medium access control (MAC) address of the source device, namely the switching device 108;

g) Flags, preferably one byte, assigned the value of one for a reply packet;

h) IP Address Count, preferably one byte, identifies the number of IP addresses contained in the subsequent fields, it is typically assigned a value of one;

i) IP Addresses, preferably multiple of four bytes, is used to specify the IP address of the switching device 108;

j) Source Host System Name, preferably 32 bytes, is used to specify the name of source device, namely the system name of the switching device 108; and k) Reserved 424, 16 bytes, is used in other AAP messages but not in VDI messages.

The VDI acknowledgement 208 in the preferred embodiment uses the same frame format as that of the VDI message 206 with the appropriate modification of the values, as described immediately above. The VDI acknowledgement frame can be sent as a broadcast packet or with the MAC address of the IP phone as received in the initial frame from the IP phone.

Upon receipt of the VDI acknowledgement 208, the IP phone 102 makes a record of the VID. The VID is then included in subsequent communication VoIP communications until the VLAN is reconfigured or the IP phone re-initialized in another location having a different VoIP VLAN. These communications including incoming and outgoing calls initiated with connection request messages 210, 212 which, if answered 224 by the call recipient coupled to the IP-PBX 104 or public switched telephone network (PSTN) (not shown) result in connection acknowledgements 214, 216 that give rise to the voice communication messages 218A, 218B.

If the VDI acknowledgement 208 further includes the connectivity information or other system attributes, the IP phone 102 can directly or indirectly convey this information to the IP PBX 104 or alternative physical locality mapping device. The IP PBX 104, for example, includes in some embodiments a relational database 106 having one or more tables that associate the switch, slot, and port numbers with the known geographic distribution of the nodes of the network 106. The database 106, which is preferably automatically updated with the initialization or installation of all VoIP devices, provides real-time access to the physical location of the IP phone 102 and substantially all other VoIP devices in the subnet 110. The database 106, or IP PBX 104 more generally, outputs the physical location of an individual IP phone 102 upon entry of one or more of the following: the device's extension number as known by the IP PBX, MAC address, switching device identification, slot number, and/or port number.

The embodiment of the invention therefore provides a method and system for automatically updating the VID of substantially all the VoIP devices in a subnet. The present invention represents a significant improvement over prior art systems that rely on the manual entry of a VoIP VLAN configuration which are prone to errors and are potential incorrect for some period of time after an IP phone is move, added, or otherwise changed.

A further embodiment encompasses a system and method incorporating IEEE 802.1x, which provides a control and authentication mechanism to regulate access between the IP phone 102 and switching device 108. Using an Extensible Authentication Protocol (EAP), for example, one or more of the messages exchanged between the IP phone 102 and the switching device 108 may comprise a machine credential used in cooperation with an authentication server to regulate access to the other. The IP phone 102 may be programmed or hardwired with the credentials needed by the authentication server for verification and assignment of a VoIP VLAN, or the VLAN assignment passed in an 802.1x message returned to the IP phone 102.

A further embodiment of the invention provides a method for providing physical connectivity information to VoIP devices to allow for automatic creation and updating of databases that contain the physical location of a given IP phone. A common practice relies on manual updating of this data base and as a consequence, prior art system may provide inaccurate physical location information with a 911 call, thereby resulting in a possible delay in the arrival of emergency personnel. The ability to quickly, accurately, and unambiguously physically locate a person in an emergency response situation clearly has life and death consequences.

Figure 3:
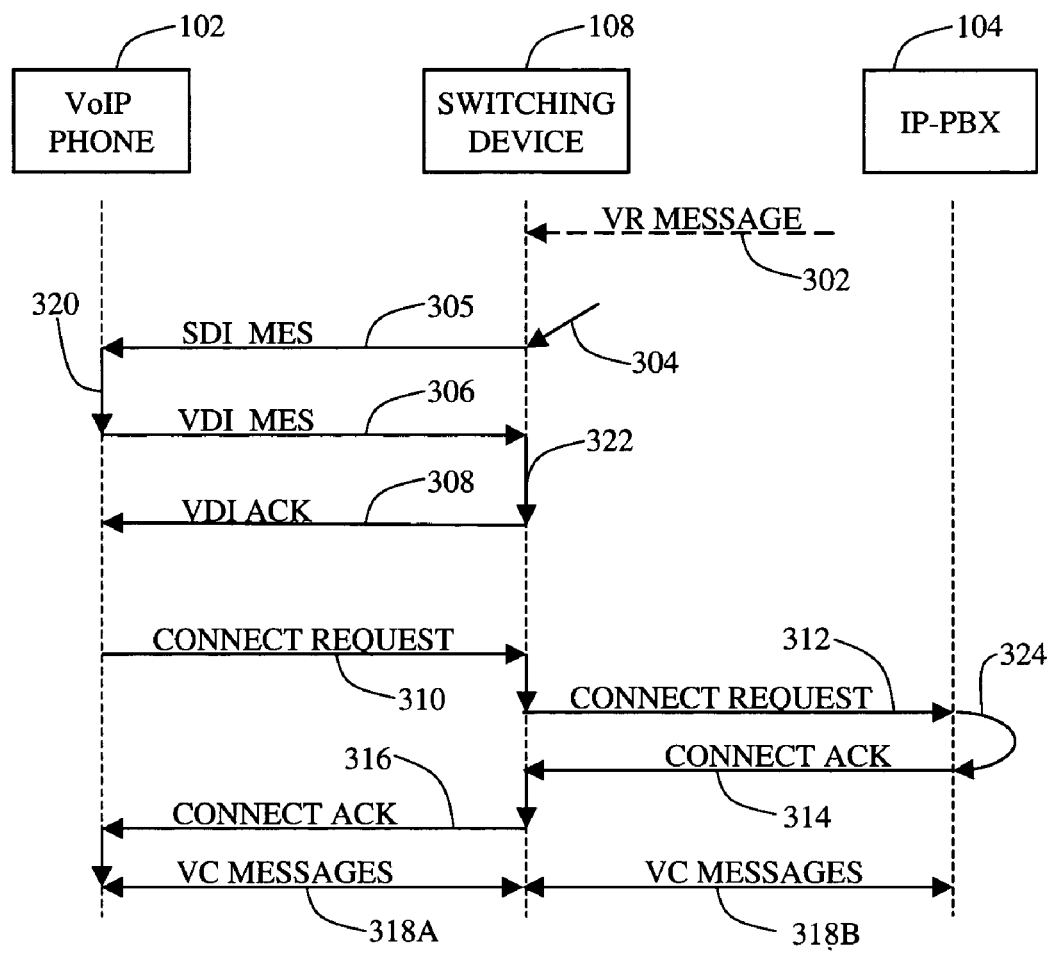
FIG. 3 is a flow diagram illustrating a system attribute exchange between an IP phone and switching device when the switching device is initialized or when the switching device detects that a new device has been connected to a port of said device, according to the preferred embodiment of the present invention.

In a second embodiment of the invention illustrated in FIG. 3, the system attribute exchange is first initiated by the switching device 108 upon initialization which generally includes start up, boot up, installation, and re-installation. After the switching device 108 is initialized during the initializing step 304, the switching device 108 automatically generates a switching device initialization (SDI) message 305 that is transmitted out of each of its interfaces. The SDI message 305 elicits a response from adjacent devices for purposes of building or updating the connectivity tables used by the switching device 108. In the preferred embodiment, the SDI message 305 uses the same frame format as that of the VDI acknowledgement 208 with suitable modification of the values contained therein.

In response to the SDI message 305, the IP phone 102 preferably generates a VoIP device identity message, preferably VDI message 306, as illustrated in identifying step 302. The VDI message 306 is substantially equivalent to the VDI message 206, the principal exception being that the destination address of the packet includes the MAC address of the switching device 108 instead of the special purpose AAP MAC address.

The switching device 108 responds in the acknowledging step 322 to the VDI message 306 with a VDI acknowledgement message 308. The switching device 108, which now knows the identity of the IP phone 102, preferably transmits the appropriate VID and, in some embodiments, additional connectivity information. The VDI acknowledgement 308 in the preferred embodiment is substantially identical to the VDI acknowledgement 208.

Similar to the previously described embodiment, the completion of the system attribute exchange lays the foundation for subsequent voice communication 318A, 318B pursuant to an incoming call or outgoing call established by connection request messages 310, 312 and the connection acknowledgement messages 314, 316, when the call is answered 324 by a recipient (not shown). Again, the connection requests messages 310, 312 and the voice communication messages transmitted to the IP PBX 104 include the VID provided by the switching device 108 in the VDI acknowledgement 308. The switching device 108, in turn, is programmed in the VoIP VID by the network administrator or learned from another node in the network 106 by means of a VLAN registration message 302.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A system exchange method for automatically providing at least one system attribute to one or more Voice-over-Internet Protocol (IP) devices in a network, the method comprising the steps of:
    (a) automatically sending a Voice-over-IP device identification message from the one or more Voice-over-IP devices to a node adjacent to the one or more Voice-over-IP devices when the one or more Voice-over-IP devices is operably coupled to the node;
    (b) automatically responding with a device identification acknowledgement message originating from the node to the one or more Voice-over-IP devices, the device identification acknowledgement message comprising one or more system attributes, including a virtual local area network (VLAN) identification of a Voice-over-IP VLAN assigned in the network and connectivity information;
    (c) conveying the connectivity information from the one or more Voice-over-IP devices through the node to a private branch exchange system that maintains an external relation database; and
    (d) associating the connectivity information at the external relation database with a geographic location of the one or more Voice-over-IP devices.

2. The system attribute exchange method of claim 1, wherein the device identification acknowledgment is a Voice-over-IP device identification acknowledgment message and wherein there is a direct connection between the one or more Voice-over-IP devices and the node.

3. The system attribute exchange method of claim 2, wherein the node is a switching device, and the one or more system attributes comprise a switching device identification as well as a port identification of a port to which the Voice-over-IP device is connected.

4. The system attribute exchange method of claim 2, wherein the one or more Voice-over-IP devices comprise one or more Internet Protocol (IP) phones.

5. The system attribute exchange method of claim 2, wherein the one or more Voice-over-IP devices is operably coupled to the node at the time of initialization of the one or more Voice-over-IP devices.

6. The system attribute exchange method of claim 2, wherein the Voice-over-IP device identification message and the Voice-over-IP device identification acknowledgment are Attribute Advertisement Protocol messages.

7. The system attribute exchange method of claim 6, wherein a destination address of the Voice-over-IP device identification message includes a unique medium access control (MAC) address indicative of a system attribute exchange between the one or more Voice-over-IP devices and node.

8. The system attribute exchange method of claim 7, wherein the media access controller (MAC) address is a broadcast MAC address.

9. The system attribute exchange method of claim 7, wherein the MAC address is a multicast MAC address.

10. The system attribute exchange method of claim 2, wherein the Voice-over-IP device identification message is sent in response to a node initialization message.

11. The system attribute exchange method of claim 10, wherein the node initialization message is a switching device initialization message transmitted by a switching device upon the initialization of the switching device.

12. The system attribute exchange method of claim 1, wherein the system attribute comprises connectivity information pertaining to physical connection of the one or more Voice-over-IP devices at the node and wherein the relation database has one or more tables that associate the node and a slot number and a port number on which the one or more Voice-over-IP devices connect to the node with the known geographic distribution of the node in the network.

13. The system attribute exchange method of claim 12, wherein one or more system attributes are transmitted to a relation database that associates at least one port number to its geographic location, whereby the physical location of the one or more Voice-over-IP devices is determined from the IP address of the one or more Voice-over-IP devices.

14. The system attribute exchange method of claim 13, wherein a storage device is included in an Internet Protocol (IP) private branch exchange (PBX) system that cooperates with the one or more Voice-over-IP devices to provide voice communications.

15. The system attribute exchange method of claim 12, wherein one or more system attribute are transmitted to a relation database that associates at least one port number to its geographic location, whereby the physical location of the one or more devices is determined from the MAC address of the Voice-over-IP device.

16. The system attribute exchange method of claim 1, wherein the node is a switching device.

17. The system attribute exchange method of claim 16, wherein at least one of the one or more system attributes is a VLAN identification substantially dedicated to Voice-over IP communication within the network.

18. The system attribute exchange method of claim 17, wherein the switching device is made aware of the VLAN identification via a VLAN registration protocol.

19. The system attribute exchange method of claim 18, wherein the VLAN registration protocol is the Group Address Resolution Protocol (GARP) VLAN registration protocol.

20. The system attribute exchange method of claim 16, wherein the switching device is adjacent to at least one of the one or more Voice-over-IP devices.

* * * * *